(12) United States Patent
Bulzacchelli et al.

(10) Patent No.: US 7,822,114 B2
(45) Date of Patent: Oct. 26, 2010

(54) DECISION FEEDBACK EQUALIZER USING SOFT DECISIONS

(75) Inventors: John F. Bulzacchelli, Yonkers, NY (US); Daniel J. Friedman, Sleepy Hollow, NY (US); Alexander Rylyakov, Mount Kisco, NY (US); Koon Lun Jackie Wong, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 11/761,586

(22) Filed: Jun. 12, 2007

(65) Prior Publication Data

US 2008/0310495 A1 Dec. 18, 2008

(51) Int. Cl.
*H03H 7/30* (2006.01)
(52) U.S. Cl. ........................ 375/233; 375/229
(58) Field of Classification Search .............. 375/233, 375/229
See application file for complete search history.

(56) References Cited

U.S. PATENT DOCUMENTS

| | | | |
|---|---|---|---|
| 7,106,099 B1 * | 9/2006 | Nix | 326/40 |
| 7,539,243 B1 * | 5/2009 | Toifl et al. | 375/229 |
| 2006/0188043 A1 * | 8/2006 | Zerbe et al. | 375/346 |

OTHER PUBLICATIONS

Grözing, "Sampling Receive Equalizer with Bit-Rate Flexible Operation up to 10 Gbit/s," Proceedings of the 32nd European Solid-State Circuits Conference, 2006, ESSCIRC 2006, Sep. 2006 pp. 516-519.*

Kenney, "A parallel architecture for multilevel decision feedback equalization," IEEE Transactions on Magnetics, vol. 34, Issue 2, Part 2, Mar. 1998 pp. 588-595.*

Kenney, "Pipelining for speed doubling in MDFE," 1996 IEEE International Conference on Communications, 1996, ICC 96, Conference Record, Converging Technologies for Tomorrow's Applications, vol. 1, Jun. 23-27, 1996 pp. 561-565 vol. 1.*

Varzaghani, "A 6-GSamples/s multi-level decision feedback equalizer embedded in a 4-bit time-interleaved pipeline A/D converter," IEEE Journal of Solid-State Circuits, on pp. 935-944, vol. 41, Issue: 4, Apr. 2006.*

Krishna, "A multigigabit backplane transceiver core in 0.13-μm CMOS with a power-efficient equalization architecture," IEEE Journal of Solid-State Circuits, pp. 2658-2666, vol. 40, Issue: 12, Dec. 2005.*

(Continued)

*Primary Examiner*—Juan A Torres
(74) *Attorney, Agent, or Firm*—Tutunjian & Bitetto, PC; Anne V. Dougherty, Esq.

(57) ABSTRACT

A decision feedback equalizer (DFE) and method include at least two paths. Each path includes the following. An adder is configured to sum an input with a first feedback tap fed back from a different path. A latch is coupled to the adder to receive a summation signal as input. The latch includes a transparent state, and an output of the latch is employed as the first tap in a feedback path to an adder of a different path, wherein a partially resolved first tap in the feedback path is employed during the transparent state to provide a soft decision to supply correction information in advance of a hard decision of the latch.

25 Claims, 15 Drawing Sheets

OTHER PUBLICATIONS

Ren, "Performance Analysis of Edge-based DFE", Electrical Performance of Electronic Packaging Oct. 2006 pp. 265-268.*

Balan et al.; A 4.8-6.4 Gbps Serial Link for Back-plane Applications using Decision Feedback Equalization: IEEE; 2004; pp. 31-34.

Balan et al.; A 4.8-6.4 Gb/s Serial Link for Backplane Applications Using Decision Feedback Equalization: IEEE Journal of Solid-State Circuits, vol. 40., No. 9; Sep. 2004; 11 pages.

Beukema et al.; A 6.4 Gb/s CMOS SerDes Core With Feed-Forward and Decision-Feedback Equalization; IEEE Journal of Solid-State Circuits, vol. 40. No. 12 Dec. 2005; 13 pages.

Kasturia et al.; Techniques for High-Speed Implementation of Non-linear Cancellation; IEEE Jounal on Selected Areas in Communications, vol. 9, No. 5, Jun. 1991; 7 pages.

Leibowitz et al.; A 7.5Gb/s 10-Tap DFE Receiver with First Tap Partial Response, Spectrally Gated Adaptation and 2nd Order Data-Filtered CDR.; ISSCC 2007/ Session 12/ Gigabit CDRs and Equalizers/ 12.4; IEEE International Solid-State Circuits Conference; 2007; pp. 228, 229 and 599.

Jin Liu et al.; Equalization in High-Speed Communication Systems; IEEE Circuits and Systems Magazine; Second Quarter 2004; pp. 4-17.

Payne et al.; A 6.25 Gb/s Binary Transceiver in0.13-m CMOS for Serial Data Transmission Across High Loss Legacy Backplane Channels; IEEE Journal of Solid-State Circutsi, vol. 40, No. 12, Dec. 2005; 12 pages.

Stojanovic et al.; Adaptive Equalization and Data recovery in a Dual-Mode (PAM2/4) Serial Link Transceiver; VSLI Symposium on Circuits, Jun. 2004; 4 pages.

Zhang et al.; A BiCMOS 10Gb/s Adaptive Cable Equalizer; IEEE International Solid-State Circuits Conference; 2004; 10 pages.

* cited by examiner

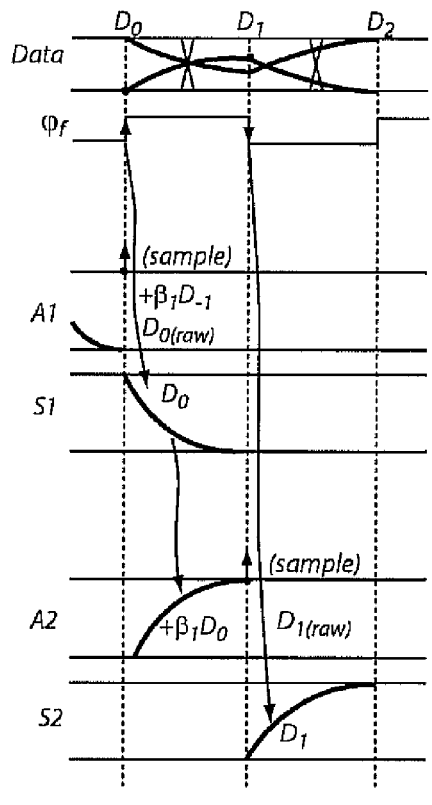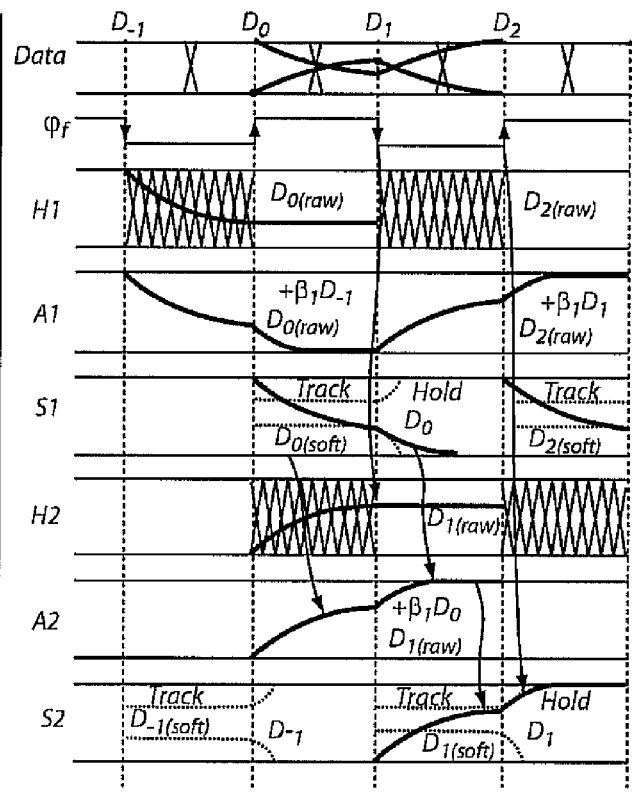
FIG. 5A
(Prior Art)
FIG. 5B

| | | I | R | Mclk | Min |
|---|---|---|---|---|---|
| 1st Stage | S1 - S4 | 320uA | 1k | 4μm | 3.2μm |
| 2nd Stage | OUT1- 4 | 160uA | 3.3k | 2μm | 1.6μm | ns
DECISION FEEDBACK EQUALIZER USING SOFT DECISIONS

BACKGROUND

1. Technical Field

The present invention relates to equalizers and more particularly to a receiver with a decision feedback equalizer.

2. Description of the Related Art

Terabits-per-second of aggregate bandwidth per integrated circuit is emerging for inter-chip communication in large digital systems. The data is often communicated over widely parallel and bandlimited channels. The two primary challenges for the I/O subsystem is power dissipation and the inter-symbol interference (ISI) due to the limited bandwidth. A number of channel equalization techniques have been introduced to compensate the ISI. Analog or mixed-mode techniques are common for the multi-Gb/s data rates by not requiring very high-speed data converters and by having low complexity. Digitally-tunable discrete-time equalizers have been attractive due to the precise equalization and tunability. In particular, decision-feedback equalizers (DFE) have become popular because of the lower noise and the digital delay chain.

Referring to FIG. 1, a basic structure of a DFE receiver 8 is shown. The architecture uses linear combinations summed by summers 12 of the delayed versions of the decision outputs to cancel the ISI. Since a slicer 10 converts the input signal to binary decisions, the delay chain can be simply implemented by digital flipflops (FF). A DFE also achieves higher signal-to-noise ratio as compared to the linear equalizer because the prior decisions are noise-free, and thus the subtraction of the ISI does not add noise to the equalized signal. Moreover, the tap coefficients ($\beta_1$, $\beta_2$, $\beta_3$) can be adapted conveniently within the receiver 8.

A tight timing constraint exists in the implementation of a mixed-signal DFE. For the first tap $\beta_1$ of the equalizer, the decision from the data slicer 10 must be fed back to the adder 12 and settle within one bit-time ($T_{bit}$). A direct implementation of the DFE structure in FIG. 1 requires high-speed and low-fanout circuits in order to meet the timing requirement.

As the operating frequency (Hz) increases, the power requirement (W) of the data slicer 10 increases rapidly in order to speed up the regeneration time when self-loading is comparable to the load capacitance. Additionally, the analog-summation node can have a large capacitance. Large analog current is often needed to reduce the summation time constants. For a given process technology, the total power of the DFE increases dramatically with higher data rates.

Several techniques have been introduced to relax the critical path delay of equalizers. Because of inherent feedback, time interleaving, a common way of relaxing the timing constraint, does not benefit a DFE.

Referring to FIG. 2, regardless the amount of interleaving, the output of each slicer 10 still has to provide a decision and feedback to the next slicer 10 within 1 bit time ($T_{bit}$). Not only is the critical path 15 not relaxed, but interleaving the DEE also results in increased power dissipation since the number of high-speed elements is multiplied.

One common approach to reduce the critical path delay is to use a look-ahead architecture, also referred to as loop-unrolled DFE, partial-response DFE, or speculative DFE. The architecture is illustratively shown in FIG. 3. Instead of feeding back the slicer decision for a first tap, a look-ahead DFE makes two decisions with two slicers 20 where each slicer 20 assumes a previous bit is a 0 and 1. The received data value is selected from these two slicer outputs based on the previous data value with a multiplexer 24. The look-ahead technique is typically limited to only one tap because of an exponential increase in the number of slicers with the number of taps. As a result, the second and higher order taps of the DFE are often fed back directly.

However, the second-tap feedback still results in a timing constraint. Dynamic feedback techniques have been proposed but result in sensitivity to a critical race that is sensitive to process variations. Nevertheless, with a look-ahead $1^{st}$ tap and a dynamic $2^{nd}$ tap, the timing constraint of a DEE can be improved by a factor of two when compared to a direct-feedback implementation. It is important to note that any power benefit from relaxing the critical path delay is counterbalanced by the duplicated slicer hardware which proportionally increases the power dissipation.

Recently, look-ahead decision feedback equalization has become more popular due to the look-ahead architecture, which relaxes the stringent timing constraint of a feedback path. However, look-ahead architecture requires hardware redundancy to cover all possible combinations of predicted data. Although only the first tap look-ahead is needed typically, the hardware and thus power doubles for a binary signal. Note that the most power consuming circuits (summers and comparators) have to be duplicated for look-ahead.

Some receivers avoid adding a second tap in first tap look-ahead DFE because the speed improvement over direct DFE is less than twice, but power is double. Therefore, a need exists for an alternative way to relax the critical path in DFEs with minimum additional power.

SUMMARY

The present principles describe a direct-feedback technique using soft-decisions. The technique can also accommodate multiple taps without straining the timing requirement and hence results in low power.

A decision feedback equalizer (DFE) and method include at least two paths. Each path includes the following. An adder is configured to sum an input with a first feedback tap fed back from a same or different path. A latch is coupled to the adder to receive a summation signal as input. The latch includes a transparent state, and an output of the latch is employed as the first tap in a feedback path to an adder of a same or different path, wherein a partially resolved first tap in the feedback path is employed during the transparent state to provide a soft decision to supply correction information in advance of a hard decision of the latch.

Another decision feedback equalizer (DFE) includes a plurality of paths. Each path has a sample and hold circuit configured to receive input data, an adder coupled to the sample and hold circuit for summing an output of the sample and hold circuit with a first feedback tap feedback and a second feedback tap and a latch coupled to the adder to receive a summation signal as input. The latch includes a transparent state, wherein the adder receives the first feedback tap and the second feedback tap from latch outputs of two paths, and wherein a partially resolved first tap in the feedback path is provided to the adder during the transparent state of the latch to make a soft decision to supply correction information in advance of a hard decision of the latch.

A method for decision feedback equalization includes summing received data with a first feedback tap fed back from a different path, in a transparent latch state, receiving a partially resolved first tap from a latch in a feedback path where an output of the latch is employed as the first tap to an adder of a different path and making a soft decision to supply correction information in advance of a hard decision of the latch.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5A is a timing diagram for a direct decision feedback equalizer in accordance with the prior art;

FIG. 5B is a timing diagram for the decision feedback equalizer of FIG. 4 in accordance with the present principles;

DETAILED DESCRIPTION OF PREFERRED EMBODIMENTS

Figure 1:
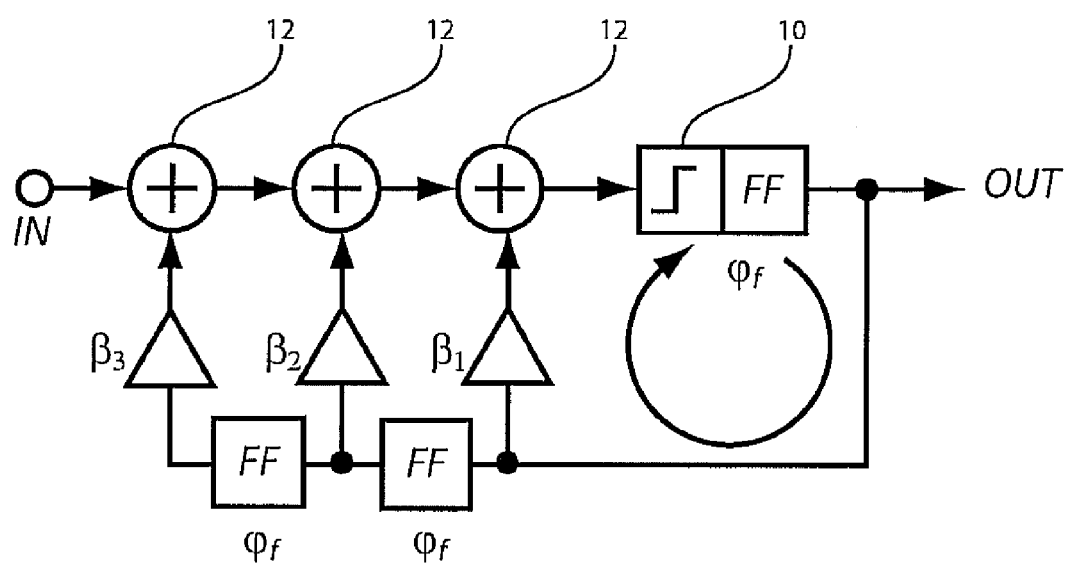
FIG. 1 is a schematic diagram showing a prior art direct decision feedback equalizer.
Figure 2:
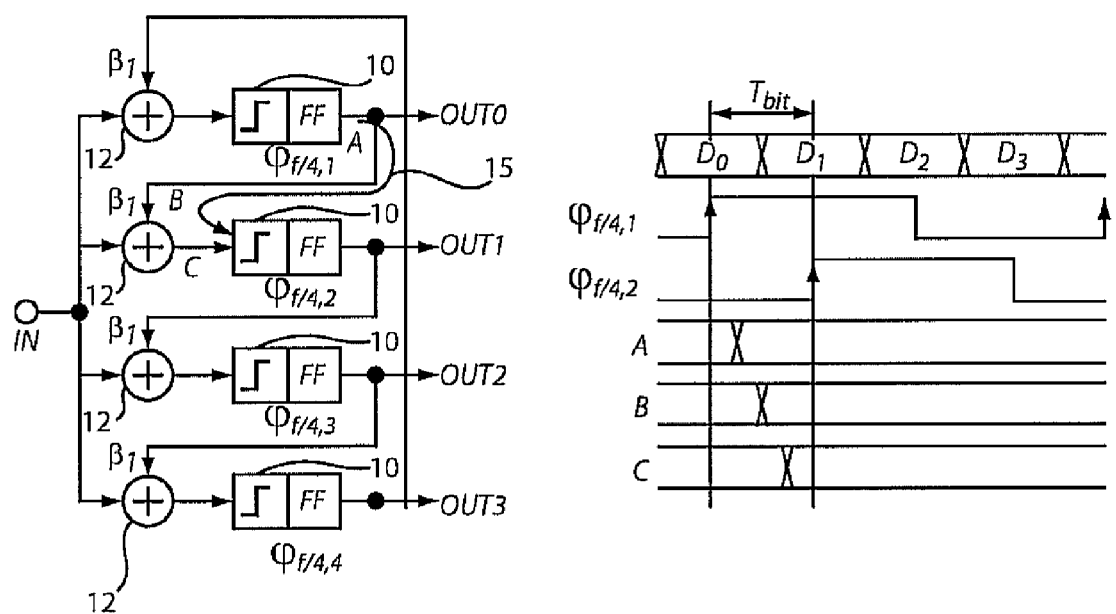
FIG. 2 is a schematic diagram showing a prior art interleaving direct decision feedback equalizer and its critical path and associated timing diagram.
Figure 3:
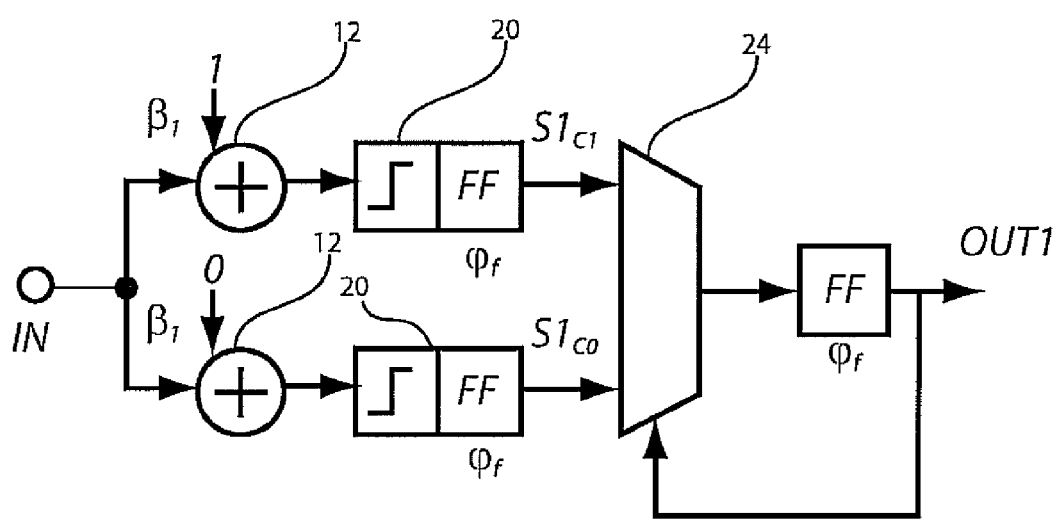
FIG. 3 is a schematic diagram showing a prior art look-ahead decision feedback equalizer.

A low-power decision feedback equalizer (DFE) is realized in accordance with the present principles by employing time borrowing techniques. In accordance with particularly useful embodiments, no look-ahead architecture is employed to relax the critical path, and thus extra power for redundant paths can be saved.

In one embodiment, feedback from a $1^{st}$ tap latch is applied to a summer while the latch is still transparent (tracks the input), and a digital decision has not yet been made. The feedback signal is therefore extended from the strictly digital domain into a full analog range, permitting both fully digital and "soft" decisions in the equalizer feedback path. The current state of the art is to apply only a fully regenerated digital feedback from a master-slave flip-flop.

The soft decision technique relaxes the restrictions on the summer settling time and reduces the speed requirements on the $1^{st}$ tap feedback latch. The present techniques add timing margin to the DFE design, which can be then traded off for an increase in speed or for a reduction in power dissipation.

In one embodiment, the DFE is error-free (e.g., bit error rate (BER) $<10^{-10}, 2^{31}-1$ PRBS (Pseudo-Random Binary Sequence)) when a 6 Gb/s, 80 mV launch amplitude differential signal passes through 10 ft of SMA cable. In this embodiment, the receiver (Rx) core only drew 4.8 mA of current from a 1.0 V supply.

The DFE in accordance with the present principles provides for a widely parallelized serial link receiver. In one embodiment, quarter-rate architecture is selected to minimize clocking power and relax timing constraints globally. The direct DFE architecture employs no look-ahead architecture, so no additional power is consumed for the redundant hardware. Also, higher order taps can be easily added without changing timing constraints. Two-tap DEE may be selected because it is sufficient for channels of short to medium distance in a particularly useful application. Other configurations such as additional taps and accommodations for longer distances are within the scope and spirit of the present principles.

Embodiments of the present invention can take the form of an entirely hardware embodiment, an entirely software embodiment or an embodiment including both hardware and software elements. In a preferred embodiment, the present invention is implemented in hardware however, elements may be implemented in software, which may include but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In particularly useful embodiments, circuits as described herein may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., Graphic Data System II (GDSII)) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 4:
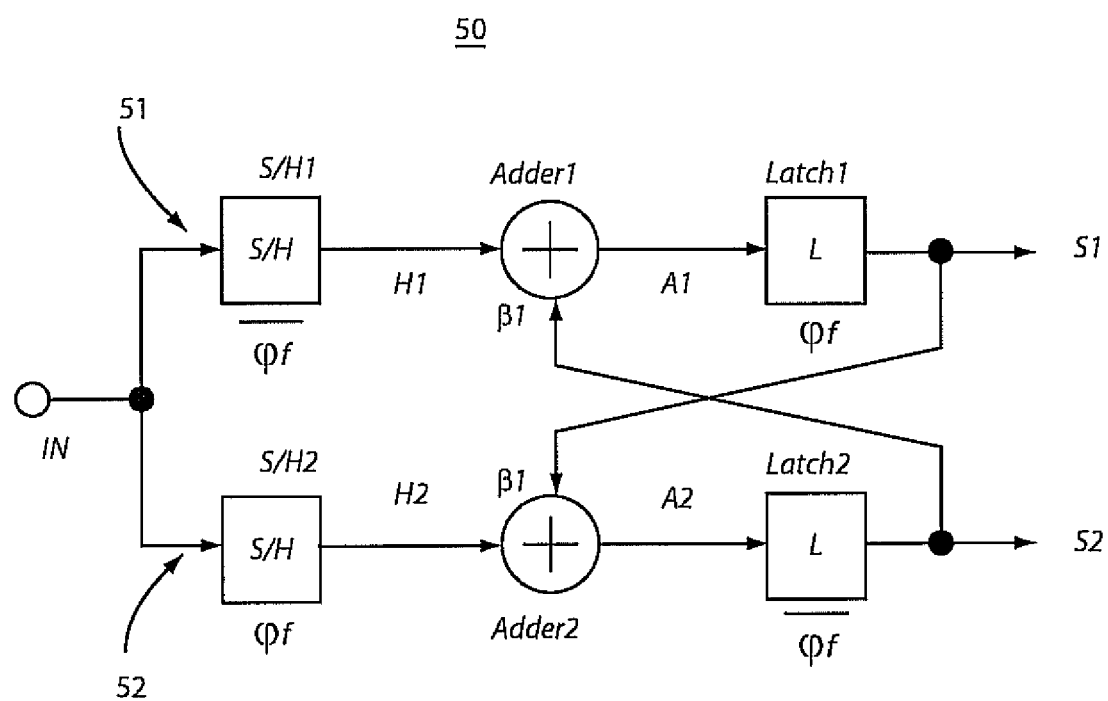
FIG. 4 is a schematic diagram showing a decision feedback equalizer in accordance with one embodiment.

Referring now to the drawings in which like numerals represent the same or similar elements and initially to FIG. 4, a schematic diagram of a DFE 50 in accordance with one embodiment is illustratively shown. The DFE 50 includes at least two paths 51 and 52 operating on different phases. A slicer that typically behaves as an edge-triggered element is replaced by a sample-and-hold (S/H1 and S/H2) and a latch (Latch1 and Latch2). The S/H is placed before a summation (Adder1 and Adder2) and hence holds the analog value of the signal when the clock is LOW (FIG. 5B). It should be noted that sample and holds S/H1 and S/H2 are preferable but optional.

The latch (e.g., Latch1 or Latch2) is transparent or "tracking" when the clock $\phi_f$ is HIGH, during which the latch behaves as a low-gain amplifier that passes the output of the adder. The HIGH-to-LOW transition causes the latch to regenerate to fully-digital or "hard" decisions. The output of the latch is fed to the summer of a different path clocked by a subsequent phase. During the HIGH clock phase, because the latch is passing an amplified version of its input signal, the information being fed back is a "soft" decision. The design includes at least two paths to avoid data racing through the latch when it is transparent.

Referring to FIG. 5B, operation of the DFE 50 (FIG. 4) with a receiver resolving the data bits, $D_0$ and $D_1$ is illustratively shown. When the clock ($\phi_f$) is low, S/H1 (node H1) tracks the input, and consequently the output of Adder1, A1, changes with the input as well. When $\phi_f$ transitions high, S/H1 holds the data $D_{0(raw)}$. Adder1 subtracts the ISI based on the decision from Latch2 and passes the signal through Latch1, which is tracking. Output of Latch1, S1, is a "soft" decision while the soft decision is not digital, it provides some ISI information to Adder2 (node A2). The early information calculates a partial result of $D_{1(raw)}+\beta_1 D_{0(soft)}$ at the output of Adder2 (A2) allowing the node to transition more quickly toward the final value. When $\phi_f$ returns low, Latch1 enters regeneration mode, which makes a hard decision $D_0$ and Adder2 (A2) calculates the final value of $D_{1(raw)}+\beta_1 D_0$.

The process is the same for the impact of the output of Latch2, D2(soft), on the summation node, A1. Both the speed requirement of the adders (Adder1 and Adder2) and the latches (Latch1 and Latch2) are relaxed because the summation nodes, A1 and A2, approach their final value more quickly since the soft decision started the transition earlier. Furthermore, because the latch output during the tracking period is approaching the final value, the latch resolving the final decision is faster.

FIG. 5A shows the timing diagram of a direct-feedback DFE to illustrate the comparison. In a direct-feedback DFE, a decision is made only at the edge of the clock. In contrast, the S/H in the DFE 50 in accordance with the present principles extends the available time period for a decision to the hold time of the sample and hold (S/H). While a hard decision is still made at the latching transition, the latch provides the information for subtracting ISI 1 bit time earlier. The improved critical path from the soft-decision architecture is even more dramatic when interleaving by 4 and using sampling clocks with skewed duty cycle.

Since TSI is canceled in the adder, an analog signal is preserved by using a sample-and-hold circuit. A latch may be employed as a slicing latch, and it has two modes. In the first mode, the latch amplifies the signal to provide a soft decision. In the second mode, the latch regenerates the signal to make a hard decision. The latch first amplifies the signal in the first half clock cycle, and it makes the hard decision when the clock triggers, e.g., to low. While the hard decision has to propagate to the next slicer within a next 1 bit time, partial results have already propagated well before hard decision is made. For a quarter rate clock, e.g., the partial result has 2 bit times to propagate. The partial results are referred to as to a "soft decision". Compared with the 1 bit time constraint required for a conventional hard decision approach (FIG. 5A), the timing constraint is greatly relaxed.

When a clock is low, the S/H is transparent, and adder is tracking the input. Next, when the clock is high, S/H holds the data, e.g., $D_{0(raw)}$. The adder A1 subtracts the ISI and passes the signal to the latch. At this moment, the latch (e.g., Latch1) is in amplification mode. The latch provides a linear gain to give a soft decision. The soft decision is not the final decision, but it permits the adder to transition in the correct direction earlier.

This early transition relaxes the long settling of the adder. The adder A2 then pre-calculates a partial result $D_{1(raw)}+\beta 1 D_0(soft)$. When the clock is triggered to low again, the latch enters a regeneration mode, which makes a hard decision $D_0$. The adder finally calculates the DFE equation, where $D_0$ is a hard decision. The adder can reach the final value earlier because soft decision started the transition earlier. While the hard decision is made on the first latch, the latch2 provides the soft decision for partial evaluation and so on.

Figure 6:
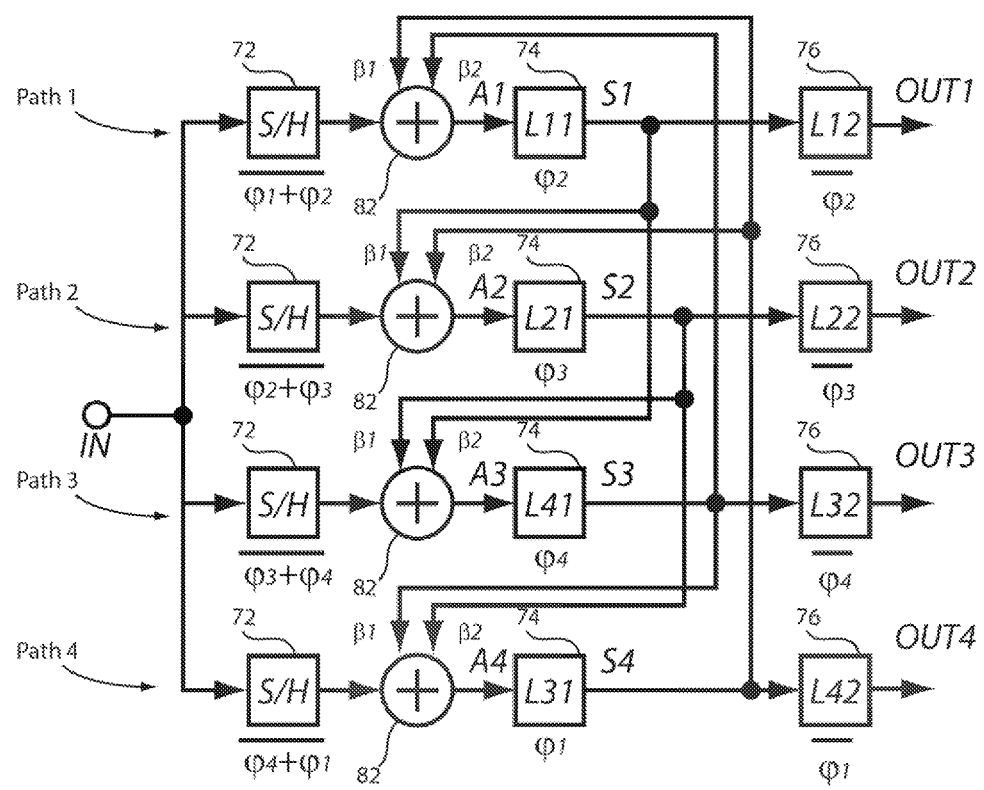
FIG. 6 is a schematic diagram showing a quarter-rate decision feedback equalizer in accordance with one embodiment.

Referring to FIG. 6, an implementation of a 2-tap DFE 70 employed in an integrated circuit chip is illustratively shown. Four S/Hs 72 are triggered by gated clocks with phases separated by 1 bit-time. Each gated clock has a 25% duty cycle. The gated clocks are created by, e.g., a NOR of two 90° shifted 50% duty-cycle clocks, $\phi_1$ to $\phi_4$. A skewed duty cycle permits the S/H 72 to hold the data for ¾ of the cycle or 3 bit-times. As will be described in FIG. 7, a longer hold period extends the period for soft decisions. The clock used for latches 74 and 76 is still 50% duty cycle so that the data at the output of the latches is held for 2 bit-times. By holding the data for 2 bit-times, the decision can be applied to 2 subsequent paths forming two parallel 2-tap DFEs. It should be understood that the sample and holds S/H 72 are preferable but optional. Traces in FIG. 7 illustrate that two soft decisions are calculated simultaneously when $\phi_2$ and $\phi_3$ are HIGH.

Figure 7:
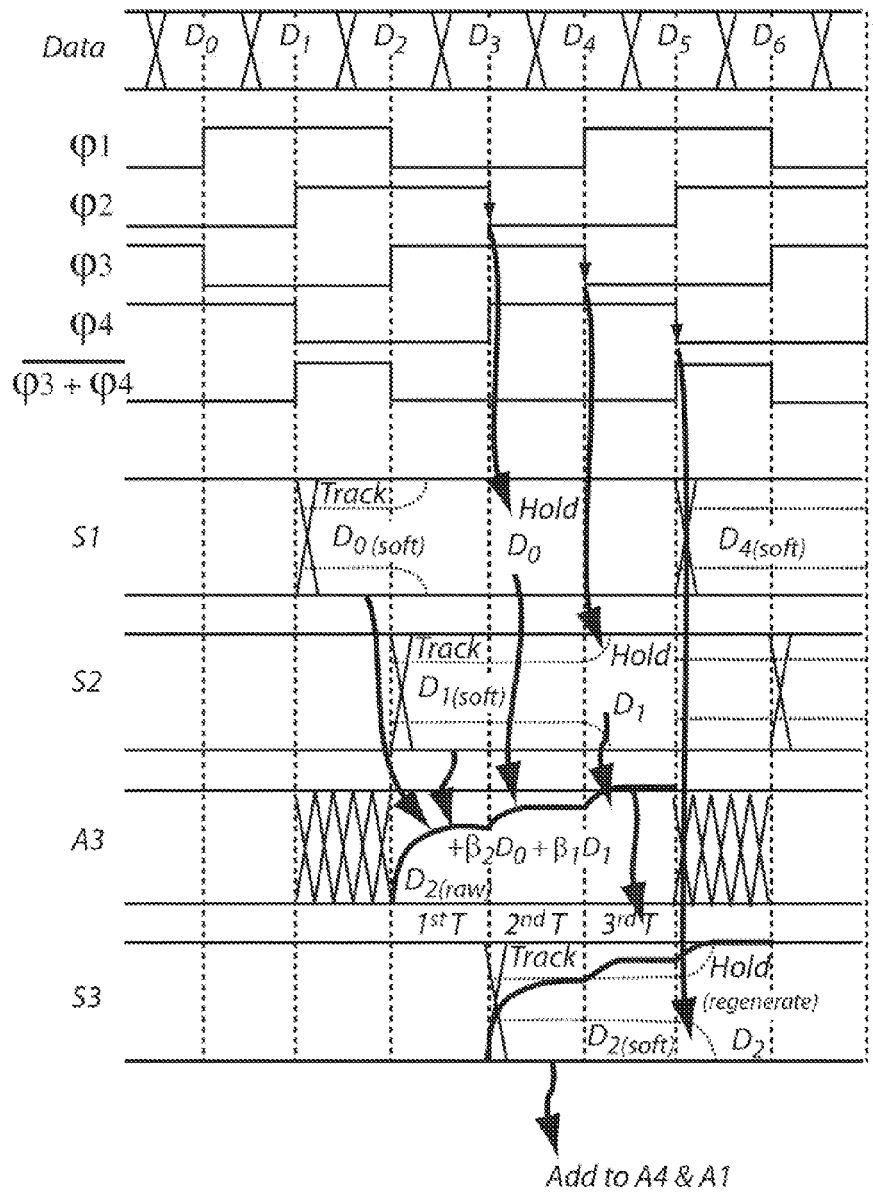
FIG. 7 is a timing diagram for the decision feedback equalizer of FIG. 6 in accordance with the present principles.

Referring to FIG. 7 with continued reference to FIG. 6, a $3^{rd}$ interleave path (OUT3) of FIG. 6 is highlighted to illustrate an exemplary operation. The $3^{rd}$ S/H 72 (in path 3) is clocked by the clock phase $\overline{\phi_3+\phi_4}$. The outputs of the latches from both of the previous paths 1 and 2 (S1 and S2), are summed by an adder 82 to produce A3. In the 1st bit time ($1^{st}$T) of a hold period, the data from both previous paths are soft decisions So $D_{0(soft)}$ and $D_{1(soft)}$ are added in the signal A3. In the 2nd bit time ($2^{nd}$T), the value from the first path, $D_{0(soft)}$ becomes a hard decision, $D_0$, due to the latching edge of S1. In the last bit time ($3^{rd}$T), $D_{1(soft)}$ of path 2 (S2) becomes a hard decision, $D_1$. The latch output (S3) makes a soft decision in the $2^{nd}$ and $3^{rd}$ bit-times and passes the partial result to path 4 and path 1. Finally, a hard decision is made at the end of the hold period of the S/H 72 of path 3.

The interleaving permits multiple earlier decisions to be used in the DFE 70 without any additional delay lines. However, interleaving beyond four may be difficult since interleaving leads to added power cost. The extended hold period of this architecture permits the output of the adder 82 and the latch 74 to start evaluating soft decisions toward the final decision several bit-times before the latching edge (3 bit-times for the adder 82 and 2 bit-times for the latch 74).

A DFE using soft decisions may include quarter-rate clocks having a 50% duty cycle and offset by, e.g., 1 unit interval (UI) from each other. In each path, incoming data is sampled by a sample-and-hold (S/H) and added in a weighted fashion to the two previous bit decisions. Because a slicer in each path is a simple latch, not an edge-triggered master-slave, the β1 feedback signal is provided to the summer not only after the previous bit has been latched (as occurs in a typical hard decision approach), but even (to a partial degree) while the previous bit decision is being computed. The benefit of this approach can be seen in the timing diagrams of FIG. 8.

Figure 8:
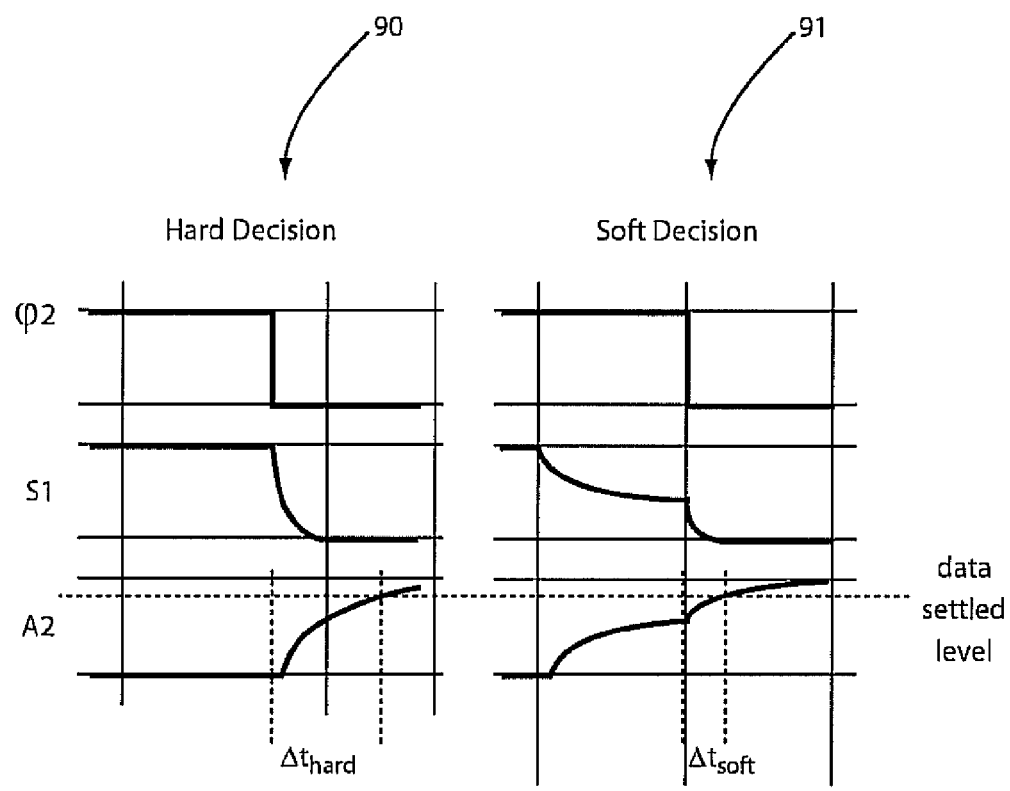
FIG. 8 is a diagram comparing a hard decision with a soft decision showing a benefit of soft decisions.

Referring to FIG. 8, a hard decision direct-feedback timing diagram 90, a slicer output S1 would not change prior to the falling edge of $\phi_2$ and thus could not affect the summer output A2 until that time, resulting in a long summer output settling time, $\Delta t_{hard}$. In contrast, a soft decision timing diagram 91 in accordance with the present principles makes the evolving output S1 available to the summer prior to the falling edge of $\phi_2$, resulting in a much shorter settling time, $\Delta t_{soft}$.

Analogies to two common circuit techniques can be drawn to lend further insight into the architecture in accordance with the present principles. First, by replacing the edge-triggered slicer with a latch-based slicer, a form of time borrowing in digital processors is provided. The clocking overhead of the latch on the critical path is less, and the longer amplification/feedback delay of some input sequences are averaged with the shorter delays. A second way to view this architecture is as a blend of a linear equalizer and a DFE.

Figure 9:
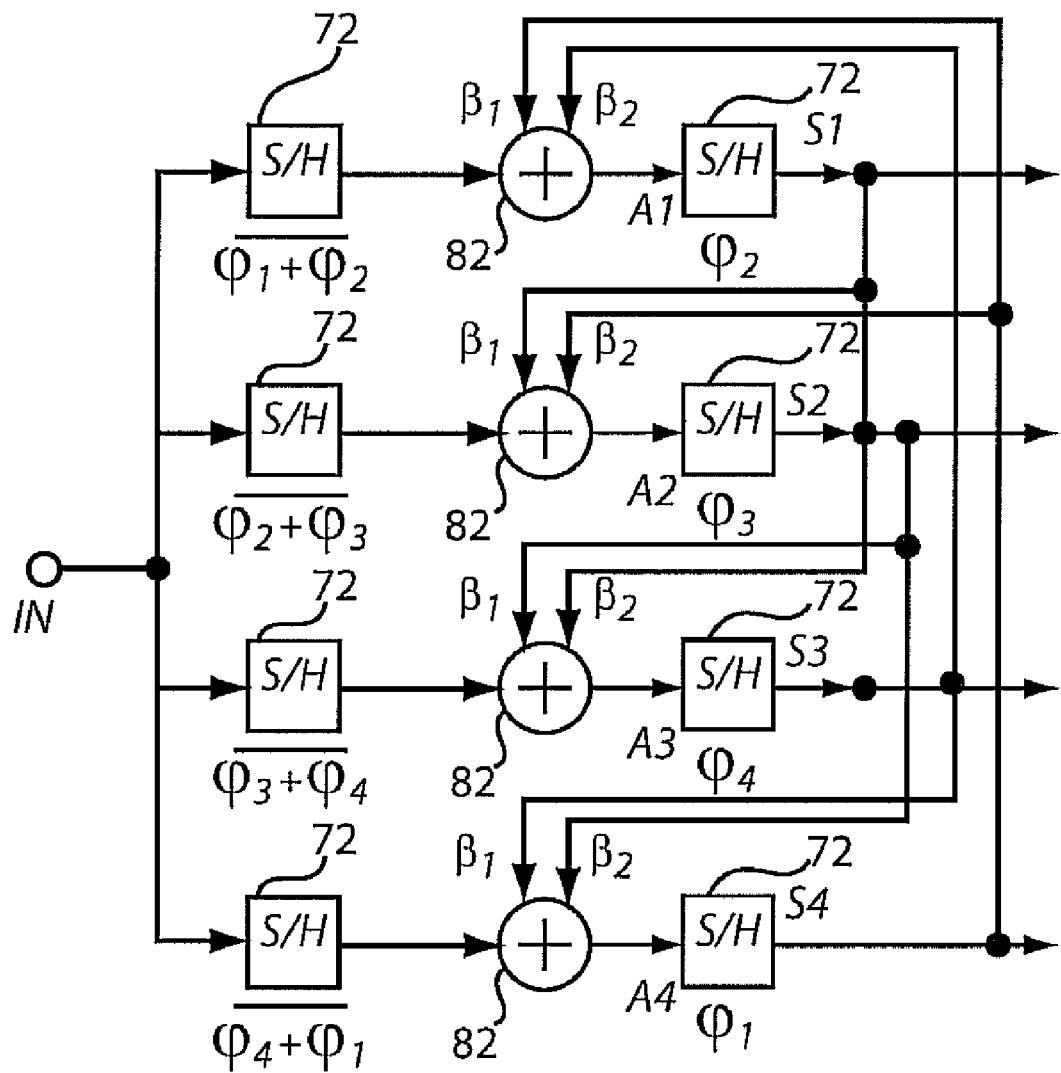
FIG. 9 is a schematic diagram showing a circuit where latches are replaced with sample (track) and holds to provide a decision feedback equalizer in accordance with one embodiment.

Referring to FIG. 9, a DFE with track-and-holds 72 replacing latches 74 (FIG. 6) is shown. Because the latch (74) regenerates and saturates its output to digital values, the noise-free subtraction of ISI improves the SNR by, e.g., 3 dB. If the data rate is pushed higher, the signal swing reduces and the latches do not completely regenerate the signal leading to a more "linear" behavior. The SNR can be approximated by assuming equal noise powers due to a feedforward section and feedback section in an infinite-length linear equalizer. When the input swing is digital and hence fully steers the differential pair, the saturated output results in the noise-free subtraction of the DFE. Simulation shows that for the design in accordance with the present principles, at 6 Gbps, the latch is completely regenerated, and thus SNR is the maximum. At 10 Gbps, simulations show that 96% of current is steered after the regeneration period, and the SNR is only slightly reduced. This view of the present architecture shows that the system is trading off a small amount of SNR to improve speed or power.

Figure 10:
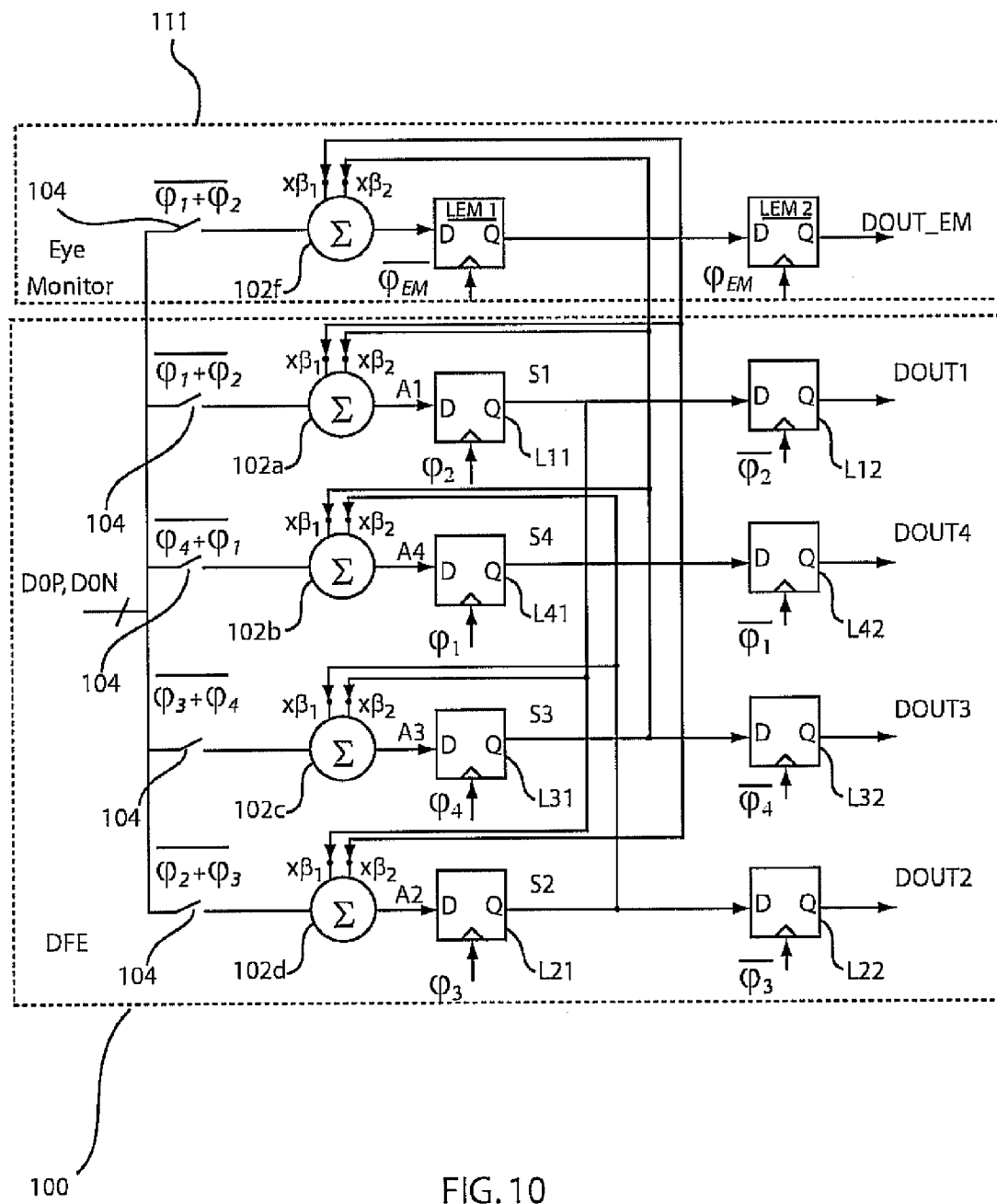
FIG. 10 is a schematic diagram showing a quarter-rate decision feedback equalizer employed in testing in accordance with one embodiment.

Referring to FIG. 10, a block diagram of a quarter-rate two-tap DFE 100 is illustratively shown in accordance with another embodiment. DFE includes adder or summer circuits 102(*a*-*d*) and sample and hold (S/H) circuits 104. Each S/H 104 samples data in accordance with a sample rate (e.g., $\overline{\phi_1+\phi_2}$, $\overline{\phi_4+\phi_1}$, $\overline{\phi_3+\phi_4}$ or $\overline{\phi_2+\phi_3}$). Each summer 102 is coupled to a latch (L11, L41, L31, L21). The latches L11, L41, L31, L21 are clocked based on clock signals $\phi_2$, $\phi_1$, $\phi_4$, and $\phi_3$, respectively. The output from latches L11, L41, L31, L21 are latched by output latches L12, L42, L32, L22, which are clocked by $\overline{\phi_2}$, $\overline{\phi_1}$, $\overline{\phi_4}$, and $\overline{\phi_3}$ respectively, in a master slave arrangement.

The summers 102 receive feedback taps $\beta_1$ and $\beta_2$ from the output from each of two predetermined latches L11, L41, L31, and L21. The front latches (L11, L41, L31, and L21) are employed to amplify small signals to digital values, and thus larger power consumption is assigned. Current consumption in one implementation is approximately 320 microA with 1 kΩ resistor loads. To save power, the second row of latches (L12, L42, L32, L22) may include, e.g., a 160 microA tail current and 3.3 kΩ resistors.

An eye monitor circuit 111 is built by duplicating one of the channels with wider offset control and separate phase control. An eye monitor circuit 111 is illustratively depicted to demonstrate how measurements were made, e.g., in an IC chip implementation. Circuit 111 is completely optional and is not needed for the practice of the present invention. Eye monitor circuit 111 includes a sampler 104 and summer 102*f*, and latches LEM1, LEM2.

Figure 11:
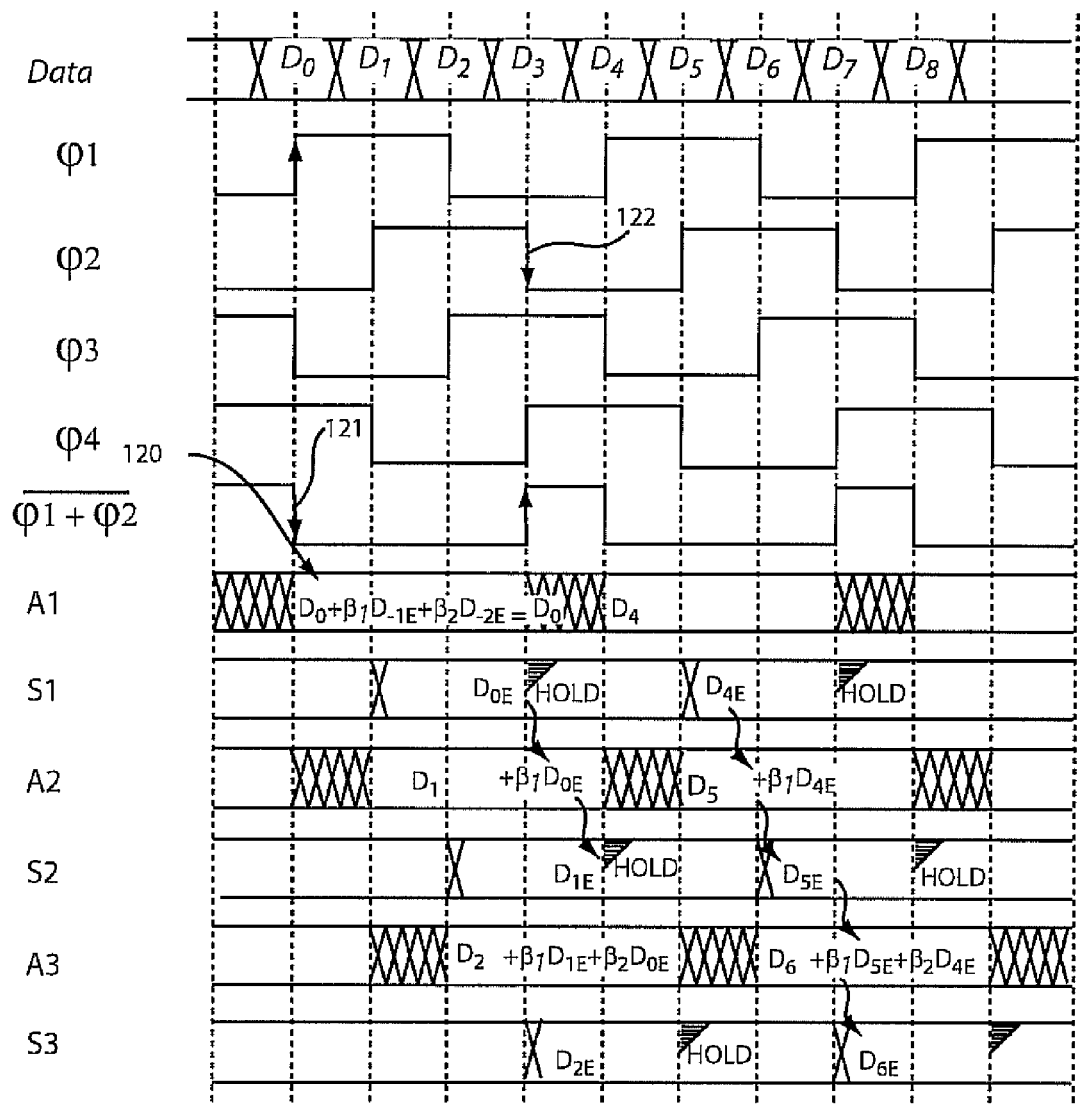
FIG. 11 is a timing diagram for data propagation for the decision feedback equalizer of FIG. 10 in accordance with the present principles.

Referring to FIG. 11 with continued reference to FIG. 10, input differential signals (Data) shown as D0P, D0N in FIG. 10 are sampled by a sampler (104) with a 25% duty cycle clock ($\overline{\phi_1+\phi_2}$). An example of a sampling of $D_0$ is shown in FIG. 11. The input signal ($D_0$ or D0P, D0N) is tracked by the sampler when $\overline{\phi_1+\phi_2}$ is high. When $\overline{\phi_1+\phi_2}$ triggers to low at 121, $D_0$ is held for 3-bits time. During this hold time 120, the sampled raw data is added to the summer 102*a*, and the previous two data bits are scaled by tap coefficients ($\beta_1,\beta_2$) and added at node A1, e.g., $D_0+\beta_1 D_{-1E}+\beta_2 D_{-2E}=D_{0E}$. The equalized data ($D_{0E}$) is then applied to the front latch L11 at A1, which tracks and amplifies the output of summer 102*a* until T2 triggers to low. At that moment, $D_{0E}$ is regenerated to a binary value, and $\overline{\phi_1+\phi_2}$ becomes high again to track the next data bit ($D_4$). The next latches (L12, L42, L32, L22) act as a slave latches and form a negative edge triggered Flip-Flops with latches L11, L41, L31, and L21, respectively.

A worst-case critical path is that starting from $\phi_2$ triggered to low at position 122, the regenerated $D_{0E}$ is added to $D_1$ (e.g., D1+$\beta_1 D_{0E}$) at summer 102*d* (node A2) and the setup time of latch L21 has to be met before $\phi_3$ is triggered to low. In other words, delay of latch ($T_{ck-q}$)+delay of summer ($T_{sum}$)+setup time of latch ($T_{setup}$)<1 time bit (T), and it is the same as that of a conventional DFE. However, $T_{sum}$ ($\Delta t_{soft}$ for the present embodiments) is less than $\Delta t_{hard}$ for conventional systems ($\Delta t_{soft} < \Delta t_{hard}$) (see FIG. 8). Soft decision making can easily be expanded to higher order multi-phase demultiplexing architectures to further reduce overhead of the latches (L11, L41, L31, L21).

Figure 12:
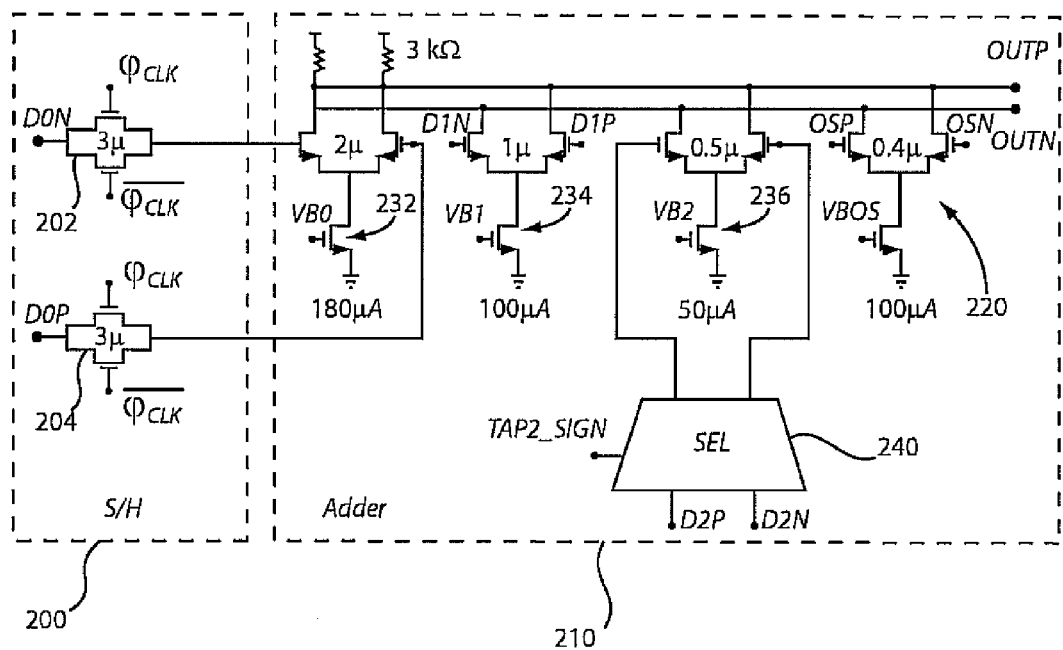
FIG. 12 is a schematic diagram showing a sample and hold circuit and an adder circuit in accordance with one embodiment.

Referring to FIG. 12, a schematic of a sample and hold (S/H) 200 and adder circuit 210 is illustratively shown. The S/H 200 is used to sample-and-hold the signal, and then the signal ISI is subtracted inside the adder 210. S/H 200 is implemented by complementary MOS switches 202 and 204 for receiving differential signals (D0N, D0P). S/H 200 is clocked by $\phi_{CLK}$ and $\overline{\phi_{CLK}}$, which are generic versions of the clock signals shown in, e.g., FIG. 11. The summation may include a small gain of, say four. A first tap input is D1P/D1N ($\beta_1$), and a second tap input is D2P/D2N ($\beta_2$). Because of the long time constant (>50 ps) at the summation output, an early transition from a soft-decision is needed for high speed. The tap coefficients of the summation are controlled by digitally programming the bias current (VB1 for first tap, VB2 for second tap with 5-bits control) of the differential transconductance stages. The latches (L11-L41 in FIG. 6, FIG. 10) may be implemented as current mode logic (CML) latches as shown in FIG. 13.

Figure 13:
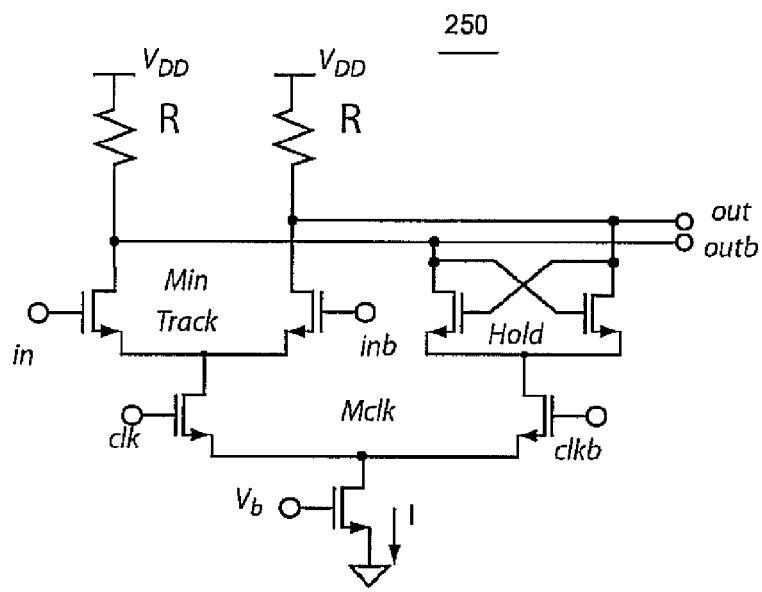
FIG. 13 is a schematic diagram showing a current mode logic latch in accordance with one embodiment.

Referring to FIG. 13, an input stage of a current mode latch 250 amplifies, in this embodiment, the summation outputs (from adder 210) by a gain of approximately 3. Latch 250 may be employed for the latches in any of the described embodiments. A minimum input swing of 5 mV is preferred to avoid meta-stable conditions. In one illustrative embodiment, latch 250 consumes a current (I) of 320 microA and uses 1-kΩ resistor (R) loads. To save power, the subsequent row of retiming latches (e.g., L12-L42 that provide output OUT1-4) consume a current (I) of 160 microA and use 3.3-kΩ resistors (R). In FIGS. 6 and 10, the first stage latches include L11, L21, L31, and L41 and the second stage latches include latches L12, L22, L32, and L42.

Referring again to FIG. 12, in adder 210, tap coefficients which correspond to data bits D1N, D1P, and D2N and D2P are controlled digitally (e.g., 5-bit logic) by changing the bias current through transistors 232, 234 and 236 using VB0, VB1, VB2. A multiplexer 240 may be employed to select D2P and D2N in accordance with a tap sign (TAP2_SIGN) signal. Static voltage offset compensation 220 may also be embedded in each adder 210 to cancel device mismatches.

The offset voltages of the adder 210 and the 1$^{st}$ latch are calibrated by a single offset compensation, which corresponds to the differential pair with input of OSP/OSN and bias of VSOS in the adder 210. Since the adder 210 is directly followed by the latch (e.g., L11), a steady differential current is injected at a middle node to compensate both offsets. While the offset of the adder 210 is compensated at the adder's output, the offset of the latch is compensated at its input node. OSP and OSN are true and complement digital signals to specify the sign of the offset correction, and VBOS is a bias voltage, which is generated by a 5-bit current DAC to program the injection current. The 2$^{nd}$ latch (e.g., L12) does not need offset compensation because of the large signal swing.

It should be noted that the dimensions and component sizes throughout the FIGS. and description are for illustrative purposes only and should not be construed as limiting. In addition, these values are provided to illustrate test results in accordance with the illustrative embodiments described.

Figure 14:
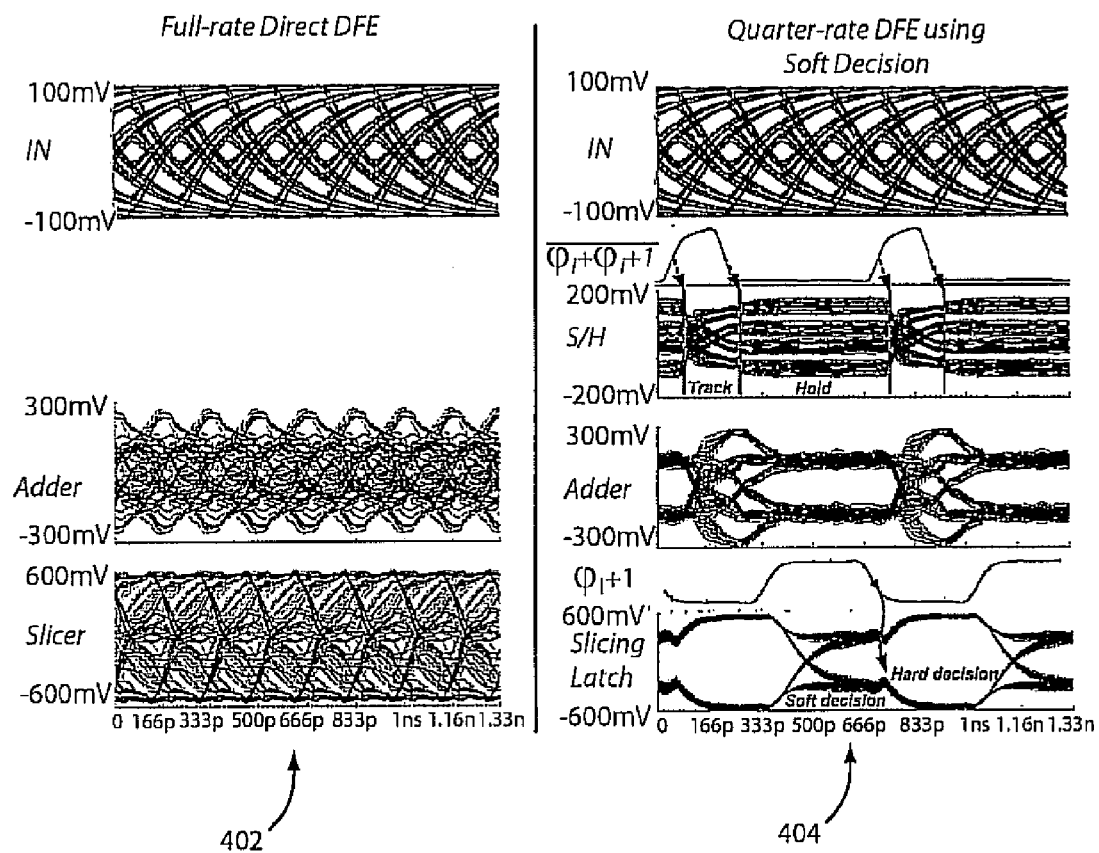
FIG. 14 are plots of simulation results for respective signals/devices for comparison of a conventional decision feedback equalizer with a decision feedback equalizer in accordance with the present principles.

Referring to FIG. 14, simulation results of a DFE in accordance with the present principles, operating at 6 Gbps, are shown. A channel in simulation includes a two-pole low-pass filter built by an RC network. For comparison, results 402 of a full-rate direct DFE are shown on the left. Because of the stringent timing constraint, direct DFE (402) fails to resolve a clean data eye. Results 404 are for a quarter-rate DFE in accordance with the present principles. At 6 Gbps, the adder output has very little ISI well before the latching edge because the transparent latch has sufficient gain to exceed the steering voltage of the differential pair.

Figure 15:
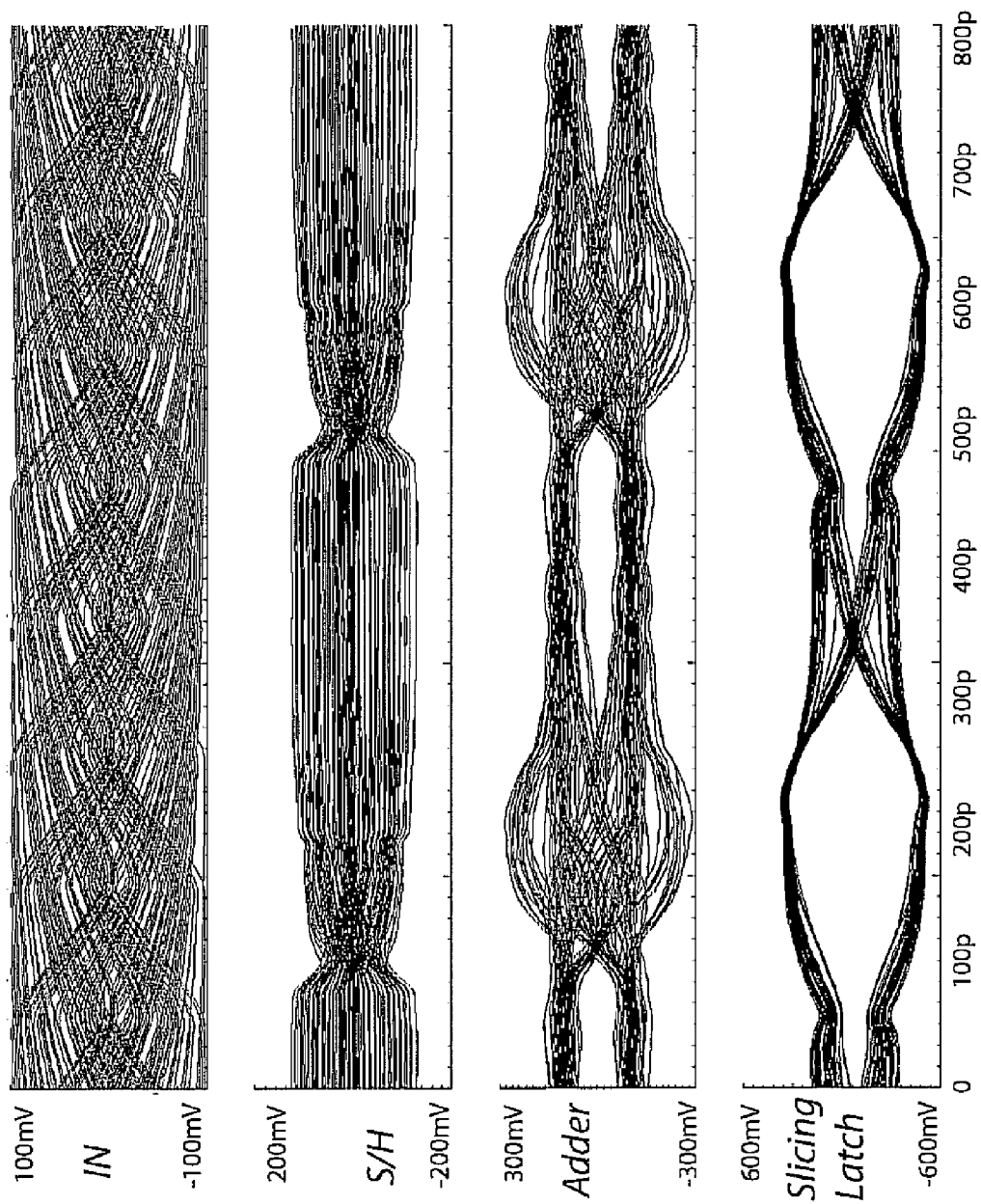
FIG. 15 shows plots of simulation results for respective signals/devices for a decision feedback equalizer at 10 Gbps in accordance with the present principles.

FIG. 15 shows the simulation of the DFE in accordance with the present principles operating at 10 Gbps. With the higher data bandwidth, the eye opening at the output of the S/H is considerably smaller. The adder relies on the soft-decision inputs to start the output transition early in order for the ISI to eventually be cancelled.

A test setup included a pattern generator used to generate a 6 Gbps $2^{31}$-1 PRBS sequence. The output was selected using external switches and was monitored by the oscilloscope and a bit-error rate tester (BERT). The measurement constraints limited the BER floor to $10^{-12}$. A 6-GHz clock was employed to provide the clock to the pattern generator and a test chip. The clock was divided by 4 on-chip, and was used for output synchronization.

A DFE was fabricated in standard 90 nm CMOS technology on a receiver chip. The DFE core occupied an area of only 45 μm×98 μm. Measurements were done on-wafer with high-speed picoprobes. A calibration signal determined the setting for compensating the combined offset of an adder and a first stage latch. Calibration was performed externally at start-up through a serial interface. Calibration logic was not implemented on-chip in this version, and its power consumption is expected to be negligible. At 6 Gbps, with offset compensation and no explicit channel attenuation, no errors are observed on all 4 outputs (DOUT1-4) with 10 mV$_{pp}$ of launch amplitude from a signal generator. With the same offset compensation setting, the receiver can handle 10-Gbps inputs of 30 mv$_{pp}$ from a signal generator with no explicit channel attenuation. The increase in signal amplitude indicated the amount of high-frequency attenuation inherent to the receiver as limited by the lack of input matching, the bandwidth of the S/H and adder, and latch hysteresis. The receiver draws 3.6 mA from 0.8V supply at 6 Gbps, and 5.3 mA from a 1.0-V supply at 10 Gbps.

The operation of the equalization is verified using a channel with 6.2-dB attenuation at 3 GHz (10 ft of SMA cable). With manually controlled DFE tap weights, no errors were observed at 6 Gbps with an 80 mV$_{pp}$ launch input (4.0 mA from 1V), and at 7 Gbps, with a 200 mV$_{pp}$ launch signal (4.8 mA from 1.2V). Without equalization, the BER is $>10^{-5}$ at all launch amplitudes up to 1V$_{pp}$. The measured speed is substantially slower than the targeted 10 Gbps in simulation because of a lack of termination on-chip, and limited tap weight of the 1$^{st}$ tap (<60% of the main tap).

The power consumption of the core was 2.88 mW, including 4 adders, 4 slicing latches, and 4 synchronization latches. Clock and bias generation consumed 0.9 mW and 0.3 mW, respectively. The total power of an operational DFE was 4.08 mW. For additional comparison, two common DFE approaches are implemented and simulated in the same 90-nm CMOS technology. The results are reported in Table 2 and are for illustrative purposes.

TABLE 2

| Simulated comparison in 90 nm CMOS technology | | | |
|---|---|---|---|
| Architecture | Direct-feedback DFE | Look-ahead DFE | DFE with soft decision in accordance with the present principles |
| Interleaving | Full-rate | Half-rate | Quarter-rate |
| # of Post Taps | 2 | 2 | 2 |
| Hardware | 2x FF, 1x Adder | 6x FF, 4x Adder, 2x Mux | 8x Latch, 4x Adder, 4x S/H |

TABLE 2-continued

Simulated comparison in 90 nm CMOS technology

| Data rate | 10 Gbps | 10 Gbps | 10 Gbps |
|---|---|---|---|
| Power | 9.5 mW | 8.7 mW | 2.88 mW |
| | FF: 3 mW | FF: 0.75 mW | FF: 0.32 + 0.16 mW |
| | Adder: 3.5 mW | Adder: 0.88 mW | Adder: 0.24 mW |

The first architecture is a 2-tap direct-feedback DFE with full-rate clock. The second architecture is a 2-tap look-ahead DFE in half-rate architecture. The device sizing of each design targets minimal power for a data rate of 10 Gbps. Using a low fanout circuit, the direct-feedback DFE consumed a large power of 9.5 mW. Although look-ahead architecture reduced the timing constraint, it required 4 parallel paths, and consumed 8.7 mW. The DFE in accordance with the present principles consumed a substantially lower power of 2.88 mW. This resulted in achieving an energy cost of well below 1 pJ/bit. Note that in the applications of serializer-deserializer (serdes), a data stream is expected to be demultiplexed into four or more channels. The demultiplexer slightly increases the power consumption of the direct DFE and the half-rate DFE.

Having described preferred embodiments of a system and method for decision feedback equalizers using soft decisions (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A decision feedback equalizer (DFE), comprising:
at least two paths, each path comprising:
an adder configured to sum an input with a first feedback tap fed back from a data path; and
a latch coupled to the adder to receive a summation signal as input, the latch including a transparent state, an output of the latch being employed as the first tap in a feedback path to an adder, wherein a partially resolved first tap in the feedback path is employed during the transparent state to provide a soft decision to supply correction information in advance of a hard decision of the latch.

2. The DFE as recited in claim 1, wherein the adder includes a settle time and the settle time is reduced by the presence of the partially resolved first tap.

3. The DFE as recited in claim 1, wherein the at least two paths includes two paths wherein the output of the latch of a first path provides the first tap to the adder of a second path and the output of the latch of the second path provides the first tap to the adder of the first path.

4. The DFE as recited in claim 1, further comprising two or more taps.

5. The DFE as recited in claim 1, wherein the DFE includes a half-rate DFE architecture with one tap of speculation.

6. The DFE as recited in claim 1, further comprising a sample and hold circuit configured to receive data and input the data to the adder.

7. The DFE as recited in claim 6, wherein the sample and hold circuit is configured to hold the data for more than one cycle.

8. The DFE as recited in claim 1, wherein the latch includes a current mode logic (CML) latch.

9. The DFE as recited in claim 1, wherein the adder is configured to sum an input with a first feedback tap fed back from a different data path than a data path that the adder is on.

10. A decision feedback equalizer (DFE), comprising:
a plurality of paths, each path comprising:
a sample and hold circuit configured to receive input data;
an adder coupled to the sample and hold circuit for summing an output of the sample and hold circuit with a first feedback tap fed back and a second feedback tap; and
a latch coupled to the adder to receive a summation signal as input, the latch including a transparent state, wherein the adder receives the first feedback tap and the second feedback tap from latch outputs of two of the plurality of paths, and wherein a partially resolved first feedback tap is provided to the adder during the transparent state of the latch supplying the first feedback tap to provide a soft decision to supply correction information to the adder in advance of a hard decision of the latch.

11. The DFE as recited in claim 10, wherein the adder includes a settle time and the settle time is reduced by the presence of the partially resolved first tap.

12. The DFE as recited in claim 10, wherein the plurality of paths includes four paths, wherein for each path the first tap and the second tap come from two different paths.

13. The DFE as recited in claim 10, further comprising three or more taps.

14. The DFE as recited in claim 10, wherein the DFE includes a quarter-rate DFE architecture with two taps of speculation.

15. The DFE as recited in claim 10, wherein the sample and hold circuit is configured to hold the input data for more than one cycle.

16. The DFE as recited in claim 10, wherein the latch includes a current mode logic (CML) latch.

17. The DFE as recited in claim 10, wherein the adder receives the first feedback tap and the second feedback tap from latch outputs of two different paths.

18. The DFE as recited in claim 10, wherein the latch for each of the plurality of paths are first stage latches and further comprising second stage latches coupled to the first stage.

19. The DFE as recited in claim 18, wherein the first stage latches and the second stage latches in a same path include a master-slave relationship.

20. A method for decision feedback equalization, comprising:
summing received data with a first feedback tap fed back from a different path; and
in a transparent latch state, receiving a partially resolved first tap from a latch in a feedback path where an output of the latch is employed as the first tap to an adder of a different path
wherein the partially resolved first tap provides a soft decision and supplies correction information in advance of a hard decision of the latch.

21. The method as recited in claim 20, further comprising reducing a settle time of the adder by the presence of the partially resolved first tap.

22. The method as recited in claim 20, further comprising at least two paths wherein the output of the latch of a first path providing the first tap to the adder of a second path and the output of the latch of the second path providing the first tap to the adder of the first path.

23. The method as recited in claim 20, further comprising sampling and holding input data to be input to the adder.

24. The method as recited in claim 23, wherein sampling and holding includes holding the input data for more than one cycle.

25. The method as recited in claim 20, wherein the latch includes a current mode logic (CML) latch.

* * * * *